Aug. 20, 1929.  T. T. ALLEN ET AL  1,725,556
DOWSER CONTROL MECHANISM FOR MOTION PICTURE PROJECTING MACHINES
Filed June 11, 1928  5 Sheets-Sheet 3

Fig. 3.

WITNESSES

INVENTORS:
Thomas T. Allen
John Francis Adams
J. Struthers Dunn
BY
ATTORNEY

Aug. 20, 1929.     T. T. ALLEN ET AL     1,725,556
DOWSER CONTROL MECHANISM FOR MOTION PICTURE PROJECTING MACHINES
Filed June 11, 1928     5 Sheets-Sheet 4

WITNESSES:

INVENTORS:
Thomas T. Allen
John Francis Adams
J. Struthers Dunn,
BY
Joshua R. H. Potts
ATTORNEY Aug. 20, 1929.    T. T. ALLEN ET AL    1,725,556
DOWSER CONTROL MECHANISM FOR MOTION PICTURE PROJECTING MACHINES
Filed June 11, 1928    5 Sheets-Sheet 5

WITNESSES:

INVENTORS:
Thomas T. Allen
John Francis Adams
J. Struthers Dunn,
BY
ATTORNEY.

Patented Aug. 20, 1929.

1,725,556

UNITED STATES PATENT OFFICE.

THOMAS TWADDEL ALLEN, JOHN FRANCIS ADAMS, AND JOHN STRUTHERS DUNN, OF PHILADELPHIA, PENNSYLVANIA, ASSIGNORS TO SENTRY SAFETY CONTROL CORPORATION, OF PHILADELPHIA, PENNSYLVANIA, A CORPORATION OF DELAWARE.

DOWSER-CONTROL MECHANISM FOR MOTION-PICTURE-PROJECTING MACHINES.

Application filed June 11, 1928. Serial No. 284,320.

This invention relates to dowser control mechanism for motion picture projecting machines.

It has for its object the collocation of control units in a single compact casing of pleasing design. The object therefore may be said to be to provide dowser control mechanism simple in construction and efficient in operation.

It is not contended that all of the devices are new in principle but the several mechanisms are so designed and arranged that the coordination of parts will produce a simplified mechanism in compact form capable of performing all the functions of hitherto unrelated elements and devices.

According to the invention, the dowser control mechanism is mounted within a closed casing and comprises means to prevent the raising of the dowser out of light obstructing position until the film is moving with sufficient rapidity across the projection aperture, a motor switch for operating the film feeding mechanism and controlled by moving the dowser to a certain predetermined point which will not move it out of light obstructing position, magnetic means which, upon the movement of the film at the required rate of speed, will permit the dowser to be raised out of light obstructing position, means for releasably holding the dowser in said last position, means operated by said magnetic means for releasing the means which holds the dowser out of light obstructing position to permit the same to fall by gravity into light obstructing position, manual means for permitting the dowser to drop into light obstructing position, and release means for permitting the dowser to be raised out of light obstructing position at any time.

The drawings illustrate an embodiment of the dowser control mechanism and the views therein are as follows:—

The dowser control mechanism is contained in a casing 11 which has an integrally formed foot 12 for mounting the same upon the cone 13 of the lamp housing (not shown) of a motion picture projecting machine. The method of attachment is shown to be by the screws 14 but it will be understood that while the cone forms a suitable support for the mechanism, it is shown thereon merely as a convenient means of support and the foot may be eliminated and any other form of mounting may be used.

The casing has a cover 16 which completely closes the operating mechanism therein and this cover has a bearing 17 formed integrally therewith for the purpose of housing a shaft 18 which extends through said casing and through a sleeve 19 in the bearing 20 formed on the end wall 21 of said casing, and a dowser arm 22 is fixed to the end of the shaft by the screw 23 which passes through the shank 24 and through said shaft. The dowser arm extends below the shank 24 and is formed for supporting on each side thereof a plate 26, which plates are secured thereto and to each other by the rivets or other fastening means 27.

The front of the casing 11 is provided with an integrally formed stop 28 and rib 29 for reinforcing said stop.

The upper end of the dowser arm is provided with an operating handle 31 which is pivotally mounted at 32 and has an inwardly projecting latch 33 which is urged downward by the spring 34 fastened to the screw 36 in said arm. The downward movement of the latch 33 is limited by the shape of the socket in which the handle is pivotally mounted. The inner side of the end wall 21 of the casing 11 is provided with an integral rib 37 against which a substantially circular mounting plate 38 abuts by its flat upper end 39, and this plate is held in position against the inner face of the end wall 21 by means of the screws 41.

The upper end of the casing is provided at its front with an inclined surface 42 beyond which is a notch 43 for receiving the latch 33 on the operating handle 31 and beyond this notch 43 is a shoulder 44 for limiting the movement of the dowser arm.

When the dowser falls into light obstructing position, as will be later explained, the latch 33 rides up the inclined surface 42 and drops into the notch 43 where it is securely held with the dowser 46 formed by the plates 26 directly in front of the source of light and obstructing the passage of said light from its source to the film which lies across the projecting aperture.

Figure 3:
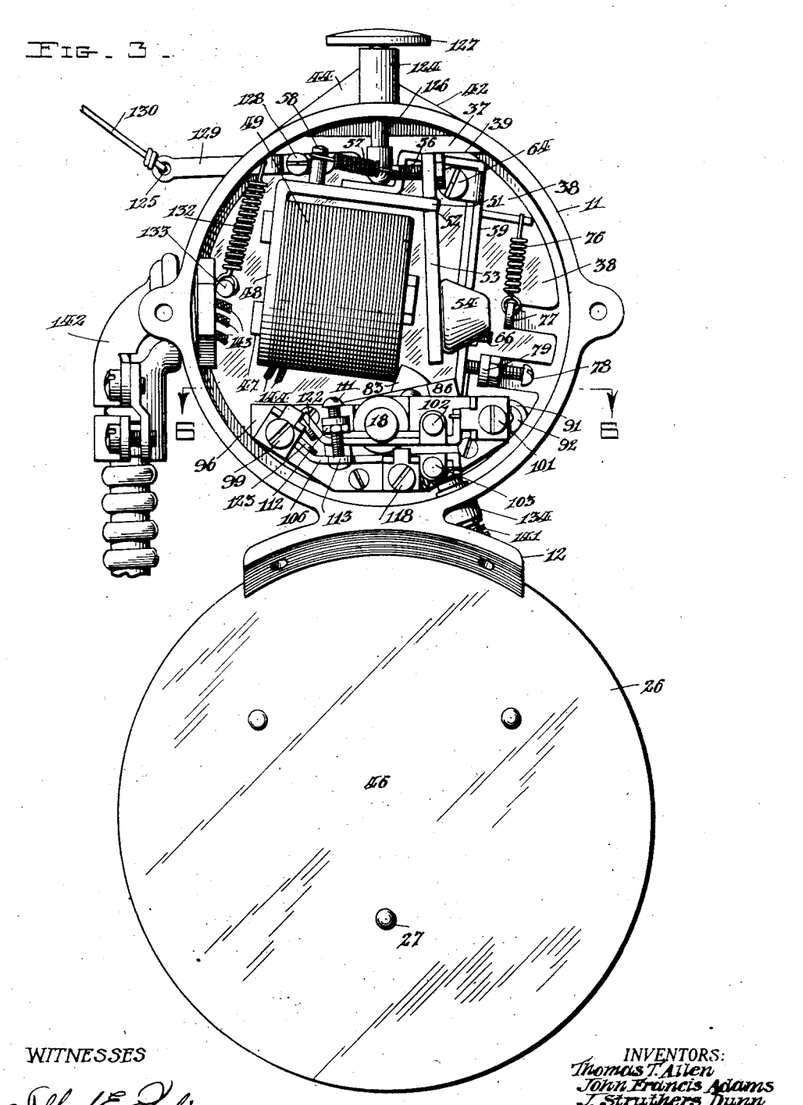
Figure 3 is a rear view of the casing showing the cover removed to disclose the operating mechanism and in this view the dowser is in light obstructing position.

The mounting plate 38 is provided with a pair of upstanding supports 47 to which is attached an angular magnet frame 48. This magnet frame has securely fixed thereto an electro-magnet 49. The upper part of this angular magnet frame is provided at its outer end with a cut-back portion which provides end lips 51 which extend into recesses 52 on the sides of the keeper 53 so as to vertically position said keeper. The magnet 49 is located off-center and in an oblique position as shown in Figure 3, and the lower end of the keeper is provided with a weight 54 for accentuating its action when it is released by the influence of the magnet. The upper end of the keeper is provided with a screw 56 to the end of which is attached a spiral spring 57 and this spring has its other end fastened to a post 58 on the upper end of the angular magnet frame so that, when the magnet is deenergized, the spring 57 will assist the weight 54 in pulling the keeper 53 to the position shown in Figure 3.

Figure 5:
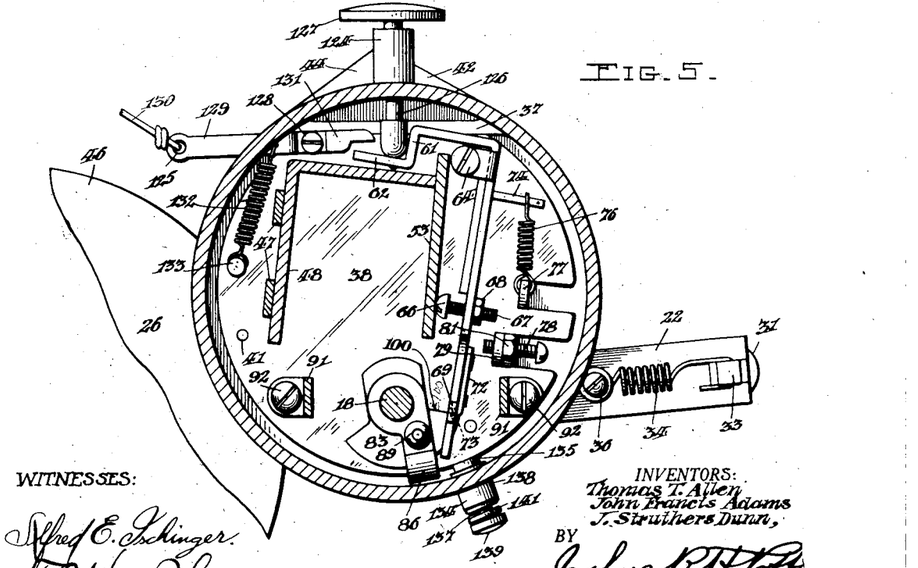
Figure 5 is a vertical section similar to Figure 4 in that it is taken on the line 4—4 of Figure 2 but shows the arrangement of the parts when the dowser has been raised out of light obstructing position.
Figure 6:
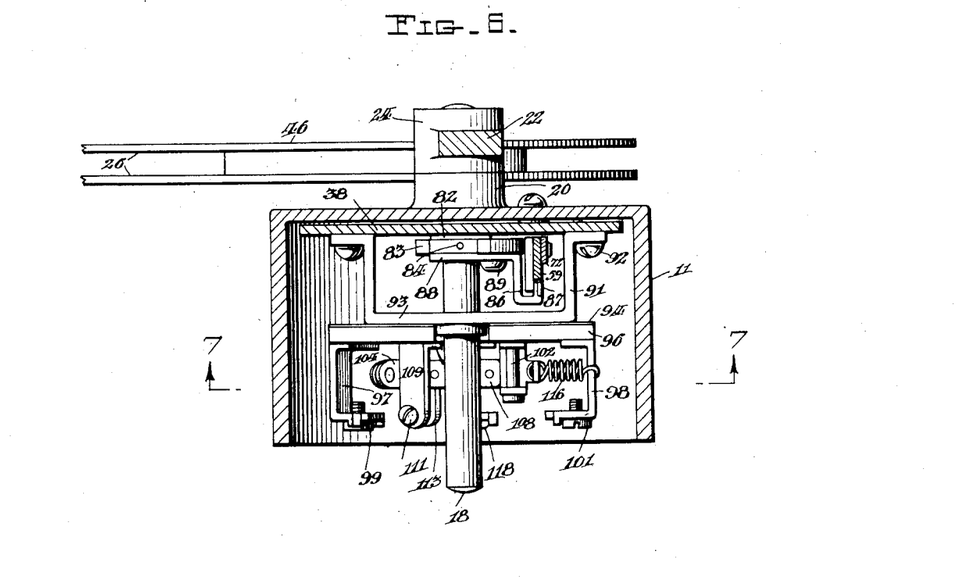
Figure 6 is a horizontol section through the dowser control mechanism casing and is taken on the line 6—6 of Figure 3 looking in the direction of the arrows.

A control plate 59 is located near the inner end of the keeper 53 and, when the keeper is drawn over against the magnet, this plate is almost parallel therewith, as shown in Figure 5. The control plate has a U portion 61 and a leg 62 which is adapted to engage with the upper end of the angular magnet frame 48. This plate 59 is pivotally supported by means of the overhanging portions 63 through which the screw 64 extends and on which the same has a limited pivoting action. This plate is also provided at a point opposite the lower end of the keeper 53 with a set screw 66 which is regulated by means of the slot 67 in its screw end and locked in position by means of the lock nut 68.

This plate has an outstanding lug 69 near the lower end thereof and extending out upon that side nearest the inner end of the casing and on its other side it is provided with a notch 71, the upper end of which is reinforced by a small plate 72 which is riveted to said platch and whose outer end 73 is turned onto the material forming said notch to provide a wearing surface. Near the upper end of the plate 59 is a finger 74 which is struck out from the material forming the plate and one end of a spiral spring 76 is connected to said finger while the other end of said spring is firmly connected to a finger 77 which is struck out from the mounting plate 38.

The plate 59 is limited in its outward movement by means of the limiting screw 78 which is mounted in the shoulder 79 struck up from the mounting plate 38 and this screw may be regulated as desired and is locked in the position by means of the lock nut 81.

The sleeve 19 passes through the mounting plate 38 and has a collar 82 which abuts said plate. Immediately beyond this collar and fixed to the shaft by the pin 84 which extends through the same is a cam 83. A latch 86, which has an overhanging finger 87, is provided with a circular portion 88 which fits around said shaft and which is fastened to the cam 83 by a screw or rivet 89 so that said latch moves with said cam.

A U-shaped bracket 91 is fastened to the mounting plate 38 by the screws 92 and the outer face 93 of said bracket is provided with a thin strip of insulation 94 against which an insulating plate 96 rests and which is fastened to the bracket. This insulating plate is suitably secured to the said bracket and has secured to its outer face oppositely disposed brackets 97 and 98 which are each provided with binding posts 99 and 101 respectively on the outer ends thereof.

The insulating plate 96 is provided with a pair of posts 102 and 103 upon which are pivotally mounted contact arms 104 and 106 respectively. The shaft 18 is cut-out as at 107 to form a cam face and the opposed face of the contact arm 104 is provided with insulating material 108 which bears against said shaft. The upper face of the insulating plate 96 is provided with a bracket 109 which has a set screw 111 extending through the same and locked into position by means of the lock nut 112. The end of this screw is adapted to rest against the upstanding limiting arm 113 on the outer contact arm 106. The pivoted end of the contact arm 104 has an out-turned end 114 which is engaged by one end of a spiral spring 116 while the other end of said spring is fastened to the bracket 98. A bracket 117 is provided just below and near the longitudinal center of the binding post 118. The contact 106 has an out-turned end 119 to which one end of a spiral spring 121 is attached while the other end of said spiral spring is attached to the bracket 117.

By reason of these connections and the action of the springs 116 and 121, it will be seen that the contact points 122 and 123 on the outer ends of the contact arms 104 and 106 respectively will each have a tendency to move toward the center of the mounting plate 38 and the insulation 108 on the contact arm 104 will therefore bear against the shaft 18 and against the cam face 107 while the outer contact arm, although having a tendency to move in said direction, will be prevented from having its contact point 123 engaged with the contact point 122 of the contact arm 104. By reason of the limiting screw 111 which is so arranged that when the shaft 18 is in the position shown in Figure 7, the cam face 107 will bear against the insulation 108 and thus allow the contact point 122 to move far enough inward to keep it away from the contact point 123 which is limited by the screw 111.

At a point immediately back of the groove 43, the casing is provided with a sleeve 124 which screws into a tap hole in said casing and the rod 126 extends through said sleeve and has a button 127 on its outer end. The inner end of a rod 126 rests upon the flat part of the leg 62 and is not of sufficient weight to overcome the action of the spring 76 except when pressure is placed thereon.

Figure 4:
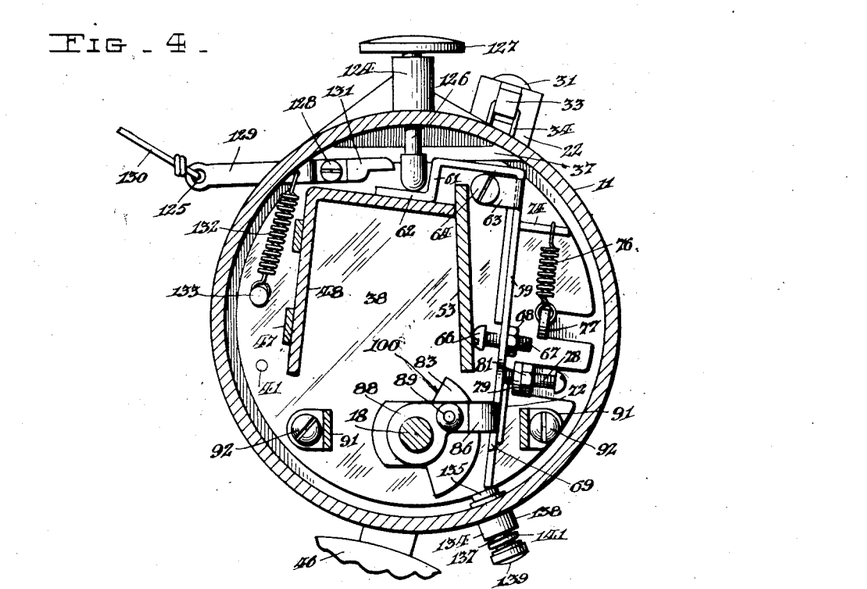
Figure 4 is a vertical section taken substantially on the line 4—4 of Figure 2 including the complete mechanism and looking in the direction of the arrows; in this figure the parts are shown with the dowser in position for operating the motor.

Pivotally mounted on the mounting plate 38 by the screw 128 is a level 129 which extends through the side of the casing and its inner end 131 extends over and slightly above the flat part of the leg 62 when it is in normal position and drawn to the position shown in Figure 4 by means of the spring 132 which is attached at an outward position beyond the pivotal point by its one end and to a post 133 on the mounting plate 38 by its other end. This lever has a wire or cord 130 tied through the hole 125 on the outer end thereof.

At the lower part of the casing is a release 134 whose inner end 135 is adjacent the lower end of the control plate 59 when the same is at its outward position, as shown in Figure 4. This release consists of a rod 137 which extends through a sleeve 138 passing through the casing and has a button 139 on the outer end thereof normally pressed outward by the spring 141 which surrounds said rod.

The casing has a hole extending through one side of the same for the entrance of the electric wires for connecting the same into the circuit and is provided with a conduit clamp 142 of the usual and approved type. The wires 143 and 144 are electrically connected through the binding post 99, 101 and 118 so that the switch mechanism which is opened and closed through the contact points 122 and 123 will be connected into the film feeding motor circuit and the magnet will be connected through a circuit in which there are the usual safety switches in the usual manner.

For a complete understanding of the wiring see the co-pending application of two of the applicants hereto, Thomas T. Allen and John Francis Adams, filed September 23rd, 1927, Serial No. 221,491.

The operation of the improved dowser control mechanism is as follows:—

Let us consider that the dowser is in light obstructing position as shown in Figure 3. The latch 33 will rest in the groove 43, the magnet 49 will be deenergized and the contact points 122 and 123 of the switch will be opened and in the position shown in Figure 7.

Figure 1:
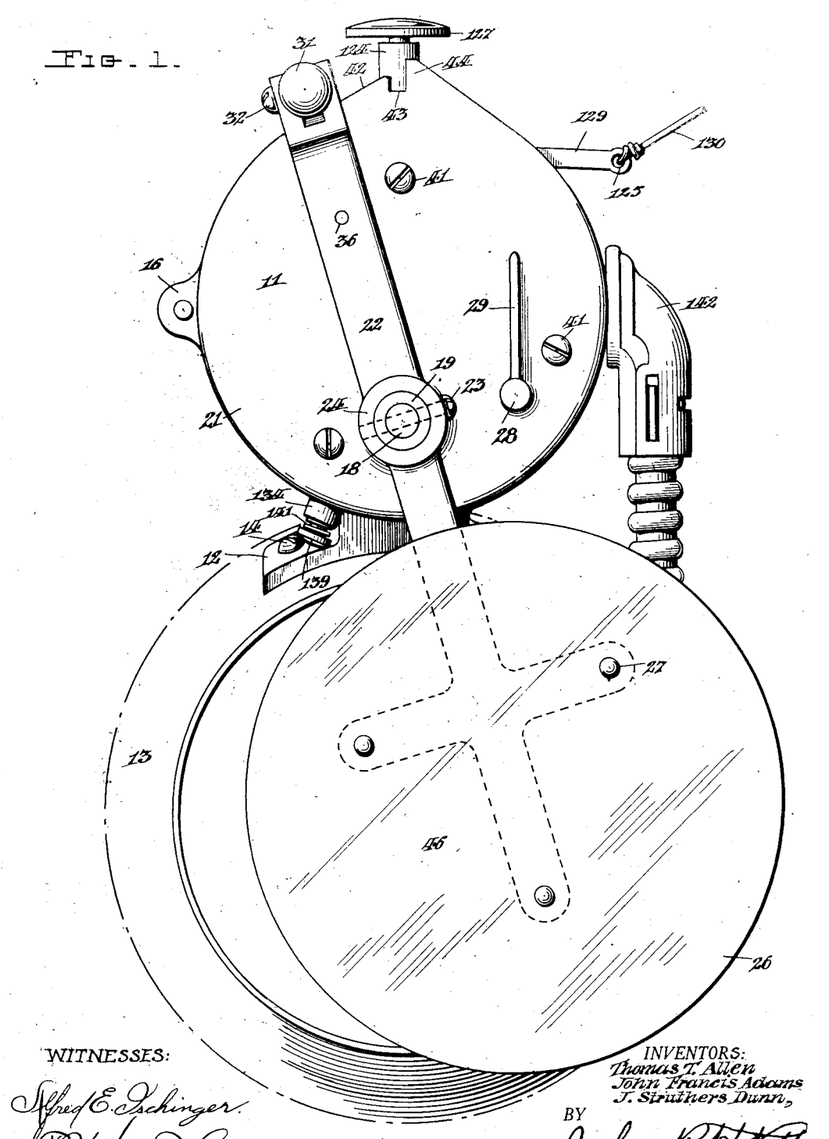
Figure 1 is a front elevation of the dowser, the casing which contains the control mechanism and the cone through which the rays from the arc light pass, and in this figure the dowser is shown in a position to close the motor circuit to permit the film feeding mechanism to gather sufficient speed to allow the dowser to be raised out of light obstructing position.
Figure 2:
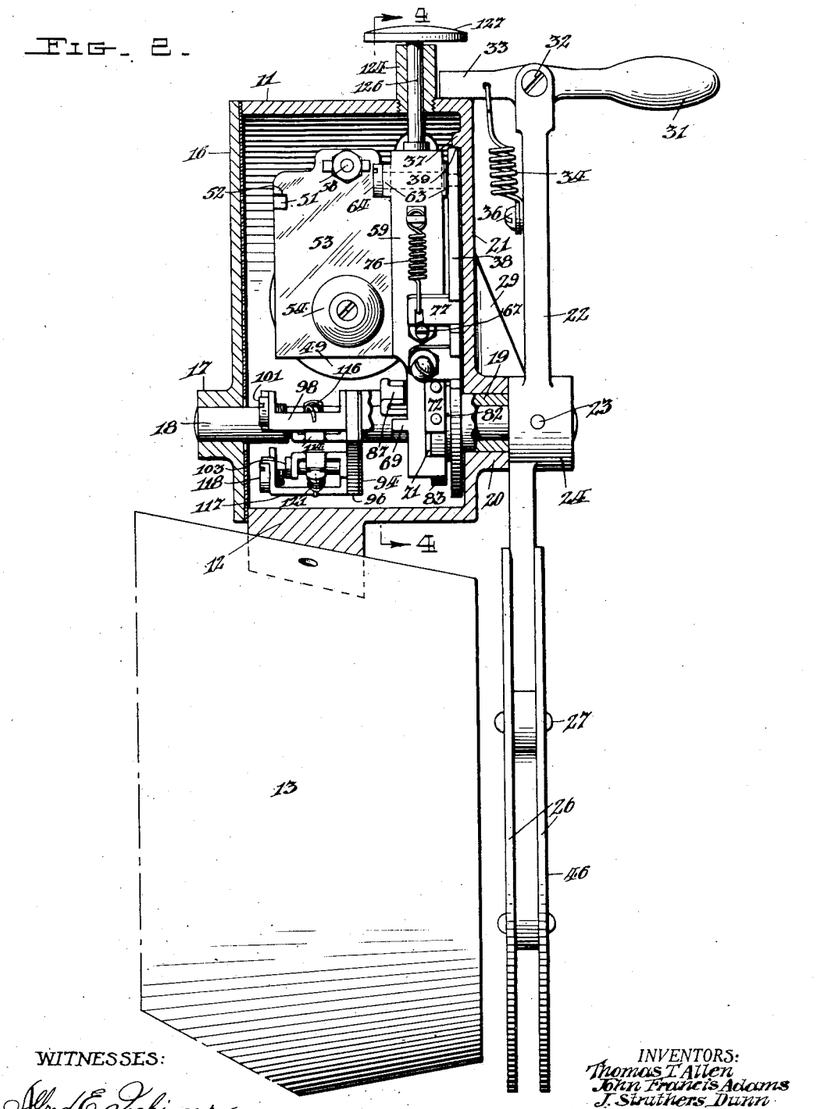
Figure 2 shows the cone with the casing of the dowser operating mechanism in vertical section with the mechanism therein however in full with the exception of a bracket at the lower part which has been broken away and in this view the dowser has been shown in light obstructing position.

In order to start the motor for feeding the film, the dowser is then moved to the position shown in Figures 1 and 4. This is accomplished by pressing the operating handle 31 downward so as to release the latch 33 from the groove 43 and then swinging the same to the position just mentioned. The dowser is prevented from moving beyond that position by reason of the overhanging finger 87 of the latch 86 resting against the outstanding lug on the lower end of the control plate 59. This plate is held in position so as to engage this latch by means of the magnet keeper 53 which is swung outward by the spring 57 and which engages the set screw 66 on said plate.

When the dowser has been moved to the position shown in Figures 1 and 4, the shaft 18 will have been slightly rotated so that the cam 107 (see Figure 7) will have pressed the contact arm 104 outward and engage the contact points 122 and 123. The closing of these contacts closes the motor circuit and causes the film to be fed across the aperture plate (not shown).

When the film feeding mechanism falls below a certain speed, the centrifugal switch or other device will short-circuit the electro-magnet 49 and release the keeper 53 but, on the other hand, when the film feeding mechanism attains a predetermined speed, the magnet will be energized through the operation of the centrifugal switch or other device so that the keeper 53 will be drawn toward the same and held thereby. The spring 76 will swing the control plate 59 to the position shown in Figure 5, thereby pulling the outstanding lug 69 over and out of the path of the finger 87 on the latch 86 so that the dowser may then be swung into the position shown in Figure 5, and the latch 86 will pass over the lug and be drawn to the position shown in said figure. The cam 83 will also have been rotated as therein shown and the cam 83 will have engaged by its curved outer face with the tip of the outer end 73 of the plate 72 in the notch 71 during the rotation of the shaft.

Of course, this will have placed a slight tension on the spring 76 and the set screw 66 will have been held slightly away from the keeper 53. When, however, the dowser reaches the position shown in Figure 5, the curved outer face of the cam will have passed the plate 72 so that the spring 76 will draw the control plate 59 to the position shown in Figure 5 where the head of the set screw 66 will rest firmly against the keeper 53 and the cam face 100 will engage the end of the plate 72 thereby locking the dowser into its raised position so that the rays from the lamp will pass through the cone 13 to project the images on the film. The upward movement of the dowser to the position just described is limited by the dowser arm 22 striking against the stop 28 on the front of the casing 11.

It might be said at this point that when it is desired to use the projecting machine for projecting images on slides, as distinguished from films, the operation just described for permitting the raising of the dowser may be accomplished by pressing the button 139 so that the inner end 135 of the release will engage the bottom of the control plate 59 and swing the same aside so as to permit the disengagement of the finger 87 on the latch 86 from the lug 69 on the lower end of said plate and the dowser can then be swung to the position shown in Figure 5 by the manual turning of the dowser arm 22. The dowser control mechanism is intended to be included in a circuit where there are safety switches which, upon the breaking or clogging of the film, the breaking of a motor transmission belt, or the blowing of the fuse of the motor, will deenergize the magnet 49.

These switches have been shown in numerous applications filed by the applicants Allen and Adams herein, and it is believed that the illustration of such devices is unnecessary. Suffice to say that when any of these defects in operation occur, the magnet 49 is deenergized.

When the magnet is deenergized, the weighted keeper 53 will fall outward, as shown in Figure 3, and will be assisted in this action by the spring 57 connecting the upper end thereof with the post 58. As this bears against the head of the set screw 66 in the control plate 59, such plate will be swung outward on its pivotal point 64 and the engagement between the cam face 100 and the outer end of the plate 72 will be broken and the dowser will fall by gravity to the position shown in Figure 3 and it will be prevented from bouncing by the latch 33 riding up the inclined face 42 and dropping into the groove 43.

Figure 7:
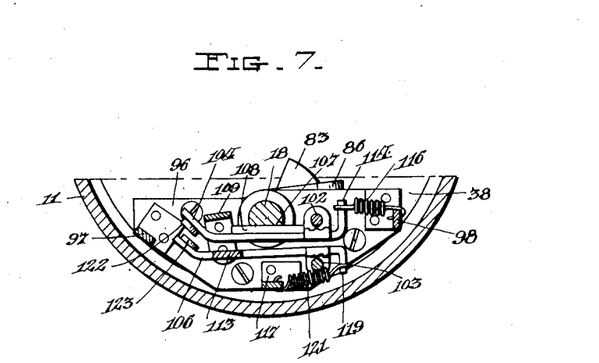
Figure 7 is a vertical section taken on the line 7—7 of Figure 6.

As the dowser falls it will of course rotate the shaft 18 and this shaft will be rotated to the position shown in Figure 7 so that the cam 107 will rest with its face flat against the insulating plate 108 on the contact arm 104 and the spring 116 will pull the outer end of this contacting arm inward so as to disengage the contact points 122 and 123.

It will be understood that while the contact arm 106 is also urged inwardly by the spring 121 that the set screw 111 in the bracket 109 will prevent the contact point 123 from following the contact point 122. The manual closing down of the projecting machine may be accomplished by pressing downward on the button 127 so that the rod 126 will press downward on the flat part of the leg 62 on the control plate 59 (see Figure 5) so that the tension of the spring 76 is overcome and the control plate swung outward as before described to disengage the cam 83 from the plate 73 in the notch 71. This will of course permit the dowser to fall in precisely the same manner as though the device were automatically operated.

For the purpose of closing the dowser and stopping the motor from a remote point, the lever 129 has been provided so that upon drawing upward on the outer end thereof through the medium of the wire or cord 130, the inner end of said lever will strike against the flat part of the leg 62 and will swing the control plate out in the manner just described.

The dowser which is formed by the two plates 26 provides an air-space between the same for the purpose of dissipating the heat from the arc when the dowser is closed by the circulation of air through the said space.

It has been found in practice that where a single plate is employed the same becomes very hot and may even cause damage to the film where the film is at rest over the aperture and the arc is maintained. Persons coming in contact with the single dowser plate have also been severely burned. With the use of the double plate which dissipates the heat both the film and the operator are protected from injury.

Of course, the dowser control mechanism illustrated may be modified in various ways without departing from the invention herein set forth and hereafter claimed.

The invention is hereby claimed as follows.

We claim:—

1. A dowser control mechanism for motion picture projecting machines comprising an electro-magnet, a keeper, a shaft upon which a dowser is mounted, a latch and a cam mounted on said shaft and rotatable therewith, a control plate swingably mounted and having means positioned by the keeper for engaging said latch to prevent the turning of said shaft and raising of said dowser when the magnet is deenergized, said plate being arranged to swing and disengage said means and latch when the magnet is energized and the keeper drawn thereto, and means on said plate engaging said cam for holding said dowser in a raised position when said magnet is energized.

2. A dowser control mechanism for motion picture projecting machines comprising an electro-magnet, a keeper, a shaft upon which a dowser is mounted, a latch and a cam mounted on said shaft and rotatable therewith, a swingable control plate, means on said control plate positioned by the keeper for engaging said latch to prevent the turning of said shaft and the raising of said dowser when the magnet is deenergized, said plate being arranged to swing and disengage said means and latch when the magnet is energized and the keeper drawn thereto, and means on said plate engaging said cam for holding said dowser in a raised position when said magnet is energized.

3. A dowser control mechanism for motion picture projecting machines comprising an electro-magnet, a keeper, a shaft upon which a dowser is mounted, a latch and a cam mounted on said shaft and rotatable therewith, a swingable control plate, an outstanding lug on said control plate positioned by the keeper for engaging said latch to prevent the turning of said shaft and the raising of said dowser when the magnet is deenergized, said plate being arranged to swing and disengage said lug and latch when the magnet is energized and the keeper drawn thereto, and means on said plate engaging said cam for holding said dowser in a raised position when said magnet is energized.

4. A dowser control mechanism for motion picture projecting machines comprising an electro-magnet, a keeper, a shaft upon which a dowser is mounted, a latch and a cam mounted on said shaft and rotatable therewith, a swingable control plate having means for swinging the lower end thereof outward when the magnet is deenergized, an outstanding lug on said control plate positioned by the keeper for engaging said latch when the lower end of said control plate is swung outward, said plate being arranged to swing and disengage said lug and latch when the magnet is energized and the keeper drawn thereto, and means on said plate engaging said cam for holding said dowser in a raised position when said magnet is energized.

5. A dowser control mechanism for motion picture projecting machines comprising an electro-magnet, a keeper, a shaft upon which a dowser is mounted, a latch and a cam mounted on said shaft and rotatable therewith, a swingable control plate, means on said control plate positioned by the keeper for engaging said latch to prevent the turning of said shaft and the raising of said dowser when the magnet is deenergized, said plate being arranged to swing and disengage said means and latch when the magnet is energized and the keeper drawn thereto, and a notch in the lower end of said plate for receiving said cam to hold said dowser in a raised position when said magnet is energized.

6. A dowser control mechanism for motion picture projecting machines comprising an electro-magnet, a keeper, a shaft upon which a dowser is mounted, a latch and a cam mounted on said shaft and rotatable therewith, a swingable control plate adapted to have the lower end thereof swung outward by the keeper when the magnet is deenergized, means on said control plate for engaging said latch when the lower end of said control plate is swung outward, said plate being arranged to swing and disengage said means and latch when the magnet is energized and the keeper drawn thereto, and a notch in the lower end of said plate for receiving said cam to hold said dowser in a raised position when said magnet is energized.

7. A dowser control mechanism for motion picture projecting machines comprising an electro-magnet, a keeper, a shaft upon which a dowser is mounted, a latch and a cam mounted on said shaft and rotatable therewith, a control plate having means positioned by the keeper for engaging said latch to prevent the turnin of said shaft and raising of said dowser when the magnet is deenergized, said plate being arranged to swing and disengage said means and latch when the magnet is energized and the keeper drawn thereto, means on said plate engaging said cam for holding said dowser in a raised position when said magnet is energized, a motor switch, and means on said shaft for opening said switch when the magnet is deenergized and the dowser falls into light obstructing position.

8. A dowser control mechanism for motion picture projecting machines comprising an electro-magnet, a keeper, a shaft upon which a dowser is mounted, a latch and a cam mounted on said shaft and rotatable therewith, a swingable control plate, means on said control plate positioned by the keeper for engaging said latch to prevent the turning of said shaft and the raising of said dowser when the magnet is deenergized, said plate being arranged to swing and disengage said means and latch when the magnet is energized and the keeper drawn thereto, means on said plate engaging said cam for holding said dowser in a raised position when said magnet is energized, a motor switch, and means on said shaft for opening said switch when the magnet is deenergized and the dowser falls into light obstructing position.

9. A dowser control mechanism for motion picture projecting machines comprising an electro-magnet, a keeper, a shaft upon which a dowser is mounted, a latch and a cam mounted on said shaft and rotatable therewith, a swingable control plate adapted to have the lower end thereof swung outward by the keeper when the magnet is deenergized, means on said control plate for engaging said latch when the lower end of said control plate is swung outward, said plate being arranged to swing and disengage said means and latch when the magnet is energized and the keeper drawn thereto, means on said plate engaging said cam for holding said dowser in a raised position when said magnet is energized, a motor switch, and means on said shaft for opening said switch when the magnet is deenergized and the dowser falls into light obstructing position.

10. A dowser control mechanism for motion picture projecting machines comprising an electro-magnet, a keeper, a shaft upon which a dowser is mounted, a latch and a cam mounted on said shaft and rotatable therewith, a swingable control plate, an outstanding lug on said control plate positioned by the keeper for engaging said latch to prevent the turning of said shaft and the raising of said dowser when the magnet is deenergized, said plate being arranged to swing and disengage said lug and latch when the magnet is energized and the keeper drawn thereto, means on said plate engaging said cam for holding said dowser in a raised position when said magnet is energized, a motor switch, and means on said shaft for opening said switch when the magnet is deenergized and the dowser falls into light obstructing position.

11. A dowser control mechanism for motion picture projecting machines comprising an electro-magnet, a keeper, a shaft upon which a dowser is mounted, a latch and a cam mounted on said shaft and rotatable therewith, a swingable control plate adapted to have the lower end thereof swung outward by the keeper when the magnet is deenergized, an outstanding lug on said control plate for engaging said latch when the lower end of said control plate is swung outward, said plate being arranged to swing and disengage said lug and latch when the magnet is energized and the keeper drawn thereto, means on said plate engaging said cam for holding said dowser in a raised position when said magnet is energized, a motor switch, and means on said shaft for opening said switch when the magnet is deenergized and the dowser falls into light obstructing position.

12. A dowser control mechanism for motion picture projecting machines comprising an electro-magnet, a keeper, a shaft upon which a dowser is mounted, a latch and a cam mounted on said shaft and rotatable therewith, a swingable control plate, means on said control plate positioned by the keeper for engaging said latch to prevent the turning of said shaft and the raising of said dowser when the magnet is deenergized, said plate being arranged to swing and disengage said means and latch when the magnet is energized and the keeper drawn thereto, a notch in the lower end of said plate for receiving said cam to hold said dowser in a raised position when said magnet is energized, a motor switch, and means on said shaft for opening said switch when the magnet is deenergized and the dowser falls into light obstructing position.

13. A dowser control mechanism for motion picture projecting machines comprising an electro-magnet, a keeper, a shaft upon which a dowser is mounted, a latch and a cam mounted on said shaft and rotatable therewith, a swingable control plate adapted to have the lower end thereof swung outward by the keeper when the magnet is deenergized, means on said control plate for engaging said latch when the lower end of said control plate is swung outward, said plate being arranged to swing and disengage said means and latch when the magnet is energized and the keeper drawn thereto, a notch in the lower end of said plate for receiving said cam to hold said dowser in a raised position when said magnet is energized, a motor switch, and means on said shaft for opening said switch when the magnet is deenergized and the dowser falls into light obstructing position.

14. A dowser control mechanism for motion picture projecting machines comprising an electro-magnet, a keeper, a shaft upon which a dowser is mounted, a latch and a cam mounted on said shaft and rotatable therewith, a swingably mounted control plate, means for pulling said keeper away from said magnet when the magnet is deenergized, an outstanding lug on the control plate, said keeper being adapted when the magnet is deenergized to press against and swing the lower end of said control plate outward to engage said outstanding lug with said latch to prevent the turning of said shaft and the raising of the dowser, and means for swinging the lower end of said control plate inward to disengage said latch and said outstanding lug when the magnet is energized and the keeper drawn away from said plate to permit the dowser to be raised.

15. A dowser control mechanism for motion picture projecting machines comprising an electro-magnet, a keeper, a shaft upon which a dowser is mounted, a latch and a cam mounted on said shaft and rotatable therewith, a swingably mounted control plate, means for pulling said keeper away from said magnet when the magnet is denergized, an outstanding lug on the control plate, said keeper being adapted when the magnet is deenergized to press against and swing the lower end of said control plate outward to engage said outstanding lug with said latch to prevent the turning of said shaft and the raising of the dowser, means for swinging the lower end of said control plate inward to disengage said latch and said outstanding lug when the magnet is energized and the keeper drawn away from said plate to permit the dowser to be raised, and means on said plate engaging said cam for holding said dowser in a raised position when said magnet is energized.

16. A dowser control mechanism for motion picture projecting machines comprising an electro-magnet, a keeper, a shaft upon which a dowser is mounted, a latch and a cam mounted on said shaft and rotatable therewith, a swingably mounted control plate, means for pulling said keeper away from said magnet when the magnet is deenergized, an outstanding lug on the control plate, said keeper being adapted when the magnet is deenergized to press against and swing the lower end of said control plate outward to engage said outstanding lug with said latch to prevent the turning of said shaft and the raising of the dowser, means for swinging the lower end of said control plate inward to disengage said latch and said outstanding lug when the magnet is energized and the keeper drawn away from said plate to permit the dowser to be raised, and means on said plate engaging said cam for holding said dowser in a raised position when said magnet is energized, said last named means adapted to release said cam to permit the dowser to drop by gravity when the magnet is deenergized.

17. A dowser control mechanism for motion picture projecting machines comprising an electro-magnet, a keeper, a shaft upon which a dowser is mounted, a latch and a cam mounted on said shaft and rotatable therewith, a swingably mounted control plate, means for pulling said keeper away from said magnet when the magnet is deenergized, an outstanding lug on the control plate, said keeper being adapted when the magnet is deenergized to press against and swing the lower end of said control plate outward to engage said outstanding lug with said latch to prevent the turning of said shaft and the raising of the dowser, means for swinging the lower end of said control plate inward to disengage said latch and said outstanding lug when the magnet is energized and the keeper drawn away from said plate to permit the dowser to be raised, a motor switch, and means on said shaft for opening said switch when the magnet is deenergized and the dowser falls.

18. A dowser control mechanism for motion picture projecting machines comprising an electro-magnet, a keeper, a shaft upon which a dowser is mounted, a latch and a cam mounted on said shaft and rotatable therewith, a swingably mounted control plate, means for pulling said keeper away from said magnet when the magnet is deenergized, and outstanding lug on the control plate, said keeper being adapted when the magnet is deenergized to press against and swing the lower end of said control plate outward to engage said outstanding lug with said latch to prevent the turning of said shaft and the raising of the dowser, means for swinging the lower end of said control plate inward to disengage said latch and said outstanding lug when the magnet is energized and the keeper drawn away from said plate to permit the dowser to be raised, means on said plate engaging said cam for holding said dowser in a raised position when said magnet is energized, a motor switch, and means on said shaft for opening said switch when the magnet is deenergized and the dowser falls.

19. A dowser control mechanism for motion picture projecting machines comprising an electro-magnet, a keeper, a shaft upon which a dowser is mounted, a latch and a cam mounted on said shaft and rotatable therewith, a swingably mounted control plate, means for pulling said keeper away from said magnet when the magnet is deenergized, an outstanding lug on the control plate, said keeper being adapted when the magnet is deenergized to press against and swing the lower end of said control plate outward to engage said outstanding lug with said latch to prevent the turning of said shaft and the raising of the dowser, means for swinging the lower end of said control plate inward to disengage said latch and said outstanding lug when the magnet is energized and the keeper drawn away from said plate to permit the dowser to be raised, means on said plate engaging said cam for holding said dowser in a raised position when said magnet is energized, said last named means adapted to be released from said cam by the keeper striking against said plate to permit the dowser to drop by gravity when the magnet is deenergized, a motor switch, and means on said shaft for opening said switch when the magnet is deenergized and the dowser falls.

20. Dowser control mechanism such as described in claim 1 having manual means for swinging the control plate inward to permit the raising of said dowser when the magnet is deenergized.

21. Dowser control mechanism such as described in claim 1 having manual means on the outside of said casing for operating a release to swing said control plate inward to permit the raising of the dowser out of light obstructing position when the magnet is deenergized.

22. Dowser control mechanism such as described in claim 1 having manual means thereon for swinging said control plate outward to disengage the means on said control plate from said cam to permit said dowser to fall into light obstructing position when the magnet is energized.

23. Dowser control mechanism such as described in claim 1 comprising manual means on the outside of the casing having a rod adapted to engage the control plate to swing the same outward to disengage the means on said plate from said cam to permit the dowser to fall into light obstructing position when the magnet is energized.

24. Dowser control mechanism such as described in claim 1 having manual means for swinging the control plate inward to permit the raising of said dowser when the magnet is deenergized, and manual means on said casing for swinging said control plate outward to disengage the means on said control plate from said cam to permit said dowser to fall into light obstructing position when the magnet is energized.

25. A dowser control unit for motion picture projecting machines comprising an electro-magnet, a keeper pivotally mounted above said magnet, a shaft upon which a dowser is mounted, a latch and a cam mounted on said shaft and rotated therewith, a swingable control plate normally urged toward said keeper, means for urging the keeper toward said plate, means on said control plate positioned by the keeper for engaging said latch to prevent the turning of said shaft and the raising of said dowser when the magnet is deenergized, said plate being arranged to swing and disengage said means and latch when the magnet is energized and the keeper drawn thereto, and means on said plate engaging said cam for holding said dowser in a raised position when said magnet is energized.

In testimony whereof we have signed our names to this specification.

THOMAS TWADDEL ALLEN.
JOHN FRANCIS ADAMS.
J. STRUTHERS DUNN.